United States Patent [19]
Morris

[11] Patent Number: 5,884,553
[45] Date of Patent: Mar. 23, 1999

[54] FOLDING PROPANE COOKER WITH INLET SUPPORT BRACE

[76] Inventor: James O. Morris, 1120 State St., North Bend, Oreg. 97459

[21] Appl. No.: 164,647

[22] Filed: Oct. 1, 1998

[51] Int. Cl.[6] .............................. A47J 37/00; A47J 37/07
[52] U.S. Cl. ................................. 99/337; 99/447; 99/449; 126/9 R; 126/25 R; 126/41 R
[58] Field of Search ............................. 99/330, 337, 338, 99/400, 401, 446–450, 481, 482; 126/38, 50, 9 R, 9 B, 25 R, 41 R, 304 A, 30; 52/645; D7/332

[56] References Cited

U.S. PATENT DOCUMENTS

| | | | |
|---|---|---|---|
| 4,210,118 | 7/1980 | Davis et al. | 126/25 R |
| 4,321,857 | 3/1982 | Best | 99/446 X |
| 4,334,462 | 6/1982 | Hefling | 126/9 R |
| 4,353,347 | 10/1982 | Seed | 99/450 X |
| 4,616,625 | 10/1986 | Froome | 126/38 X |
| 4,759,276 | 7/1988 | Segroves | 99/337 |
| 4,773,319 | 9/1988 | Holand | 99/447 X |
| 4,949,701 | 8/1990 | Krosp et al. | 126/41 R |
| 4,989,580 | 2/1991 | Dunham | 126/41 R |
| 5,121,676 | 6/1992 | Jurgens | 99/482 X |
| 5,333,540 | 8/1994 | Mazzocchi | 99/449 X |
| 5,423,308 | 6/1995 | Huang et al. | 126/25 R |
| 5,761,990 | 6/1998 | Stewart et al. | 99/447 X |

*Primary Examiner*—Timothy F. Simone

[57] ABSTRACT

A foldable fuel cooker is provided including a central member and a plurality of legs pivotally connected to central member via pipes mounted thereon. An inlet tube is connected to the central member and extends therefrom to a central extent of one of the legs. A brace is mounted on one of the legs for preventing the inlet tube from being inadvertently removed.

5 Claims, 5 Drawing Sheets

FOLDING PROPANE COOKER WITH INLET SUPPORT BRACE

BACKGROUND OF THE INVENTION

1. Field of the Invention

The present invention relates to burner tripods and more particularly pertains to a new folding propane cooker with inlet support brace for providing a propane cooker that has improved air ventilation, more robust hinged couplings, and an improved inlet which is less susceptible to being inadvertently detached.

2. Description of the Prior Art

The use of burner tripods is known in the prior art. More specifically, burner tripods heretofore devised and utilized are known to consist basically of familiar, expected and obvious structural configurations, notwithstanding the myriad of designs encompassed by the crowded prior art which have been developed for the fulfillment of countless objectives and requirements.

Known prior art burner tripods include U.S. Pat. No. 5,423,308; U.S. Pat. No. 5,333,540; U.S. Pat. No. 4,949,701; U.S. Pat. No. 4,393,857; U.S. Pat. No. 4,210,118; and U.S. Pat. No. Des 256,316.

The prior art burner tripods further includes that which is shown in FIGS. 1–3. Such tripod includes a cylindrical central member with two legs pivotally mounted thereon and a third leg fixed with respect to the central member. The foregoing pivotal coupling is accomplished by way of an inferior compression fitting. The central member has a height which is approximately equal to that of the inboard extents of the legs. As shown in FIG. 3, a bottom face of the tripod has a bottom face with a washer welded therein for reasons that will soon become apparent. The prior art tripod further includes an inlet pipe which is constructed from a bendable brake line. As shown in FIG. 3, the brake line has a vertically oriented inboard portion welded within an aperture of the washer and having a grease zert mounted to a top end thereof. As such, ventilation is precluded. The prior art tripod further includes a horizontally oriented outboard portion spaced below the bottom face of the central member and extending therefrom in an adjacent spaced relationship with the fixed leg. As shown in FIGS. 1 & 2, the horizontally oriented outboard portion extends past an outboard extent of the fixed leg whereat a coupler is positioned for connecting with a gas supply hose. The inlet tube of the prior art tripod is highly susceptible to being broken off. The prior art device is constructed from a stainless metal.

In these respects, the folding propane cooker with inlet support brace according to the present invention substantially departs from the conventional concepts and designs of the prior art, and in so doing provides an apparatus primarily developed for the purpose of providing a propane cooker that has improved air ventilation, more robust hinged couplings, and an improved inlet which is less susceptible to being inadvertently detached.

SUMMARY OF THE INVENTION

In view of the foregoing disadvantages inherent in the known types of burner tripods now present in the prior art, the present invention provides a new folding propane cooker with inlet support brace construction wherein the same can be utilized for providing a propane cooker that has improved air ventilation, more robust hinged couplings, and an improved inlet which is less susceptible to being inadvertently detached.

The general purpose of the present invention, which will be described subsequently in greater detail, is to provide a new folding propane cooker with inlet support brace apparatus and method which has many of the advantages of the burner tripods mentioned heretofore and many novel features that result in a new folding propane cooker with inlet support brace which is not anticipated, rendered obvious, suggested, or even implied by any of the prior art burner tripods, either alone or in any combination thereof.

To attain this, the present invention generally comprises a vertically oriented cylindrical central member having a tubular side wall, an open bottom face, and an open top face. Both open faces are completely open in that they each define openings having a diameter equal to that of the central member. FIG. 4 shows that two cylindrical pipes are each mounted to an exterior surface of the side wall along an axis in parallel with that of the central member. Each pipe has a length less than that of the central member and a diameter about ¼ that of the central member. Next provided are three legs each having a horizontally oriented linear top bar and a vertically oriented first linear side bar connected to one end of the top bar and extending downwardly therefrom. The first linear side bar is equipped with a first length which is about twice a height of the central member. A vertically oriented second linear side bar is connected to another end of the top bar and extends downwardly therefrom. The second linear side bar is equipped with a second length greater than the first length. An angled linear bottom bar is connected between bottom ends of the side bars such that each of the bars reside in a similar plane. The first linear side bar of two of the legs has a central extent being rotatably coupled within the two pipes. Further, a pair of spaced washers are welded to the forgoing two legs which extend radially therefrom in the form of flanges for precluding vertical movement within the pipes. The first linear side bar of one of the legs has a central extent being fixedly welded directly to the central member. As such, the forgoing leg resides in a plane extending radially from the central member. In use, the legs have deployed orientations extending radially from the central member and spaced by 120 degrees. Further, the legs are capable of stored orientations each directed in a similar direction and residing in parallel planes. Also included is a rigid inlet pipe which is linear along an entire length thereof. The inlet pipe has an inboard threaded end and an outboard threaded end. A first portion of the pipe adjacent to and spaced from the inboard end is welded to a lower peripheral edge of the central member. As such, the inlet pipe extends radially therefrom. A second portion of the pipe adjacent to and spaced from the first portion is welded to the first linear side bar of the fixed leg. The outboard threaded end of the inlet pipe terminates half way between the linear side bars, as shown in FIG. 4. For precluding the inlet tube from being inadvertently removed, a linear brace has a first end welded to an upper extent of the first linear side bar of the fixed leg at a point level with the top face of the central member. A second end of the brace is welded to an inboard extent of the bottom bar of the fixed leg such that the brace resides within the plane that includes the bars of the fixed leg. It should be noted that a central extent of the inlet pipe is welded just below a central extent of the brace. Mounted on the end of the inlet tube is a brass cap having a closed end, an open end, and a hexagonal side wall. The side wall defines an interior space having a threaded periphery adjacent the open end for attachment to the inboard threaded end of the inlet tube. The side wall has an orifice formed therein which remains in communication with the inlet tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new folding propane cooker with inlet support brace apparatus and method which has many of the advantages of the burner tripods mentioned heretofore and many novel features that result in a new folding propane cooker with inlet support brace which is not anticipated, rendered obvious, suggested, or even implied by any of the prior art burner tripods, either alone or in any combination thereof.

It is another object of the present invention to provide a new folding propane cooker with inlet support brace which may be easily and efficiently manufactured and marketed.

It is a further object of the present invention to provide a new folding propane cooker with inlet support brace which is of a durable and reliable construction.

An even further object of the present invention is to provide a new folding propane cooker with inlet support brace which is susceptible of a low cost of manufacture with regard to both materials and labor, and which accordingly is then susceptible of low prices of sale to the consuming public, thereby making such folding propane cooker with inlet support brace economically available to the buying public.

Still yet another object of the present invention is to provide a new folding propane cooker with inlet support brace which provides in the apparatuses and methods of the prior art some of the advantages thereof, while simultaneously overcoming some of the disadvantages normally associated therewith.

Still another object of the present invention is to provide a new folding propane cooker with inlet support brace for providing a propane cooker that has improved air ventilation, more robust hinged couplings, and an improved inlet which is less susceptible to being inadvertently detached.

Even still another object of the present invention is to provide a new foldable fuel cooker including a central member and a plurality of legs pivotally connected to the central member via pipes mounted thereon. An inlet tube is connected to an open bottom of the central member and extends therefrom to a central extent of one of the legs. A brace is mounted on one of the legs for preventing the inlet tube from being inadvertently removed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
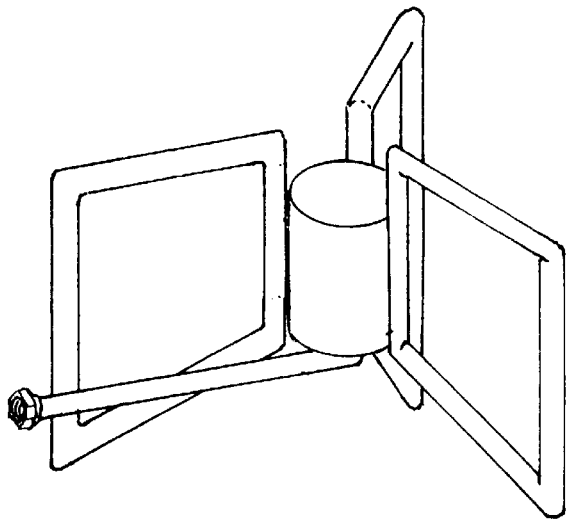
FIG. 1 is a perspective view of a prior art propane cooker.
Figure 2:
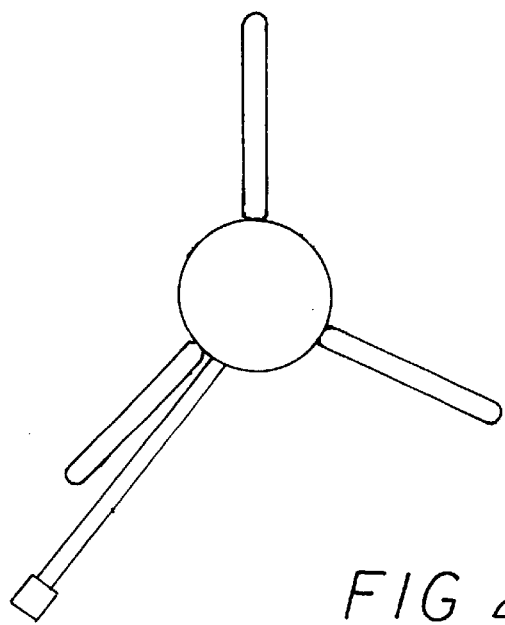
FIG. 2 is a top view of the prior art propane cooker.
Figure 3:
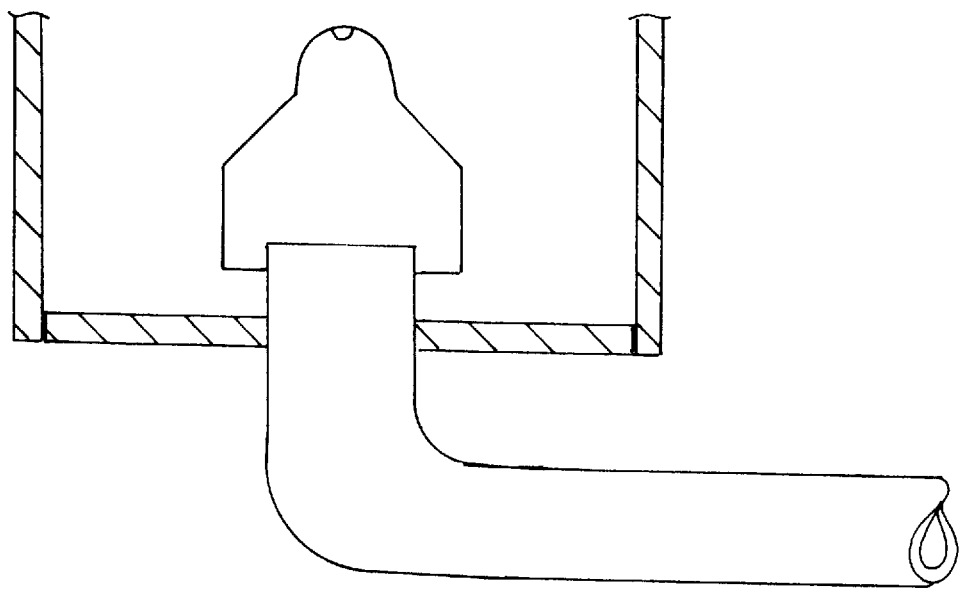
FIG. 3 is a cross-sectional view of the inlet pipe of the prior art propane cooker.

With reference now to the drawings, and in particular to FIGS. 1 through 9 thereof, a new folding propane cooker with inlet support brace embodying the principles and concepts of the present invention and generally designated by the reference numeral 10 will be described.

The present invention, as designated as numeral 10, includes a vertically oriented cylindrical central member 12 constructed from black steel and having a tubular side wall 14, an open bottom face, and an open top face. Both open faces are completely open in that they each define openings having a diameter equal to that of the central member. Preferably, the central member is 2 inches in diameter.

Figure 4:
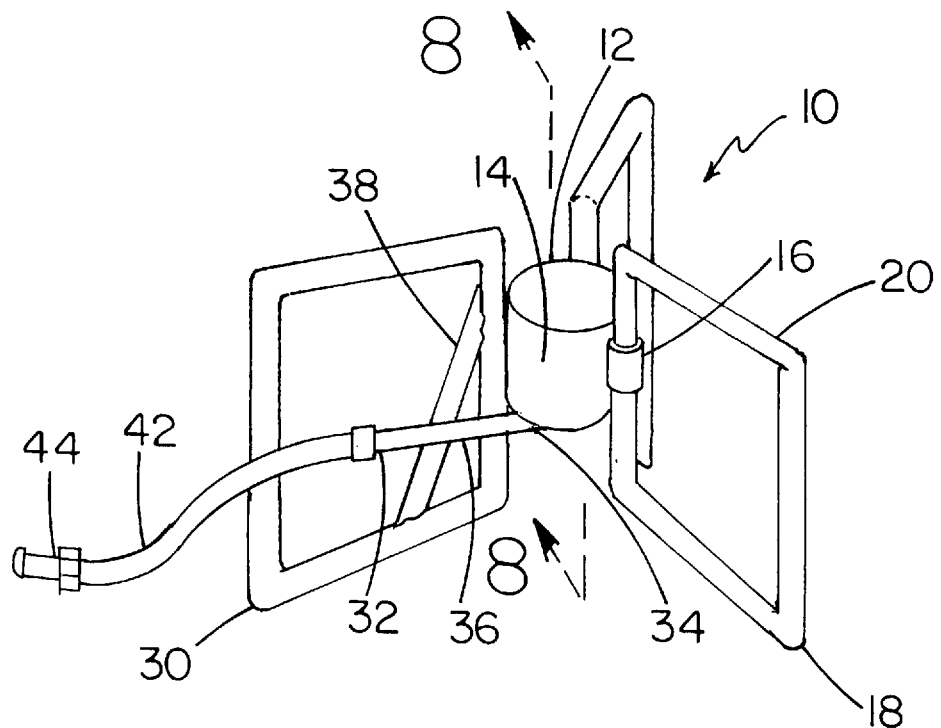
FIG. 4 is a perspective view of a new folding propane cooker with inlet support brace according to the present invention.
Figure 5:
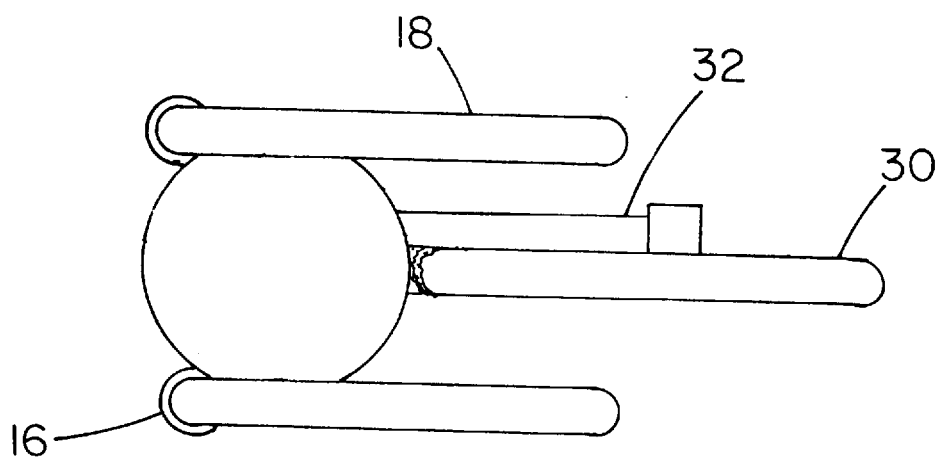
FIG. 5 is a top view of the present invention in a stored orientation.
Figure 6:
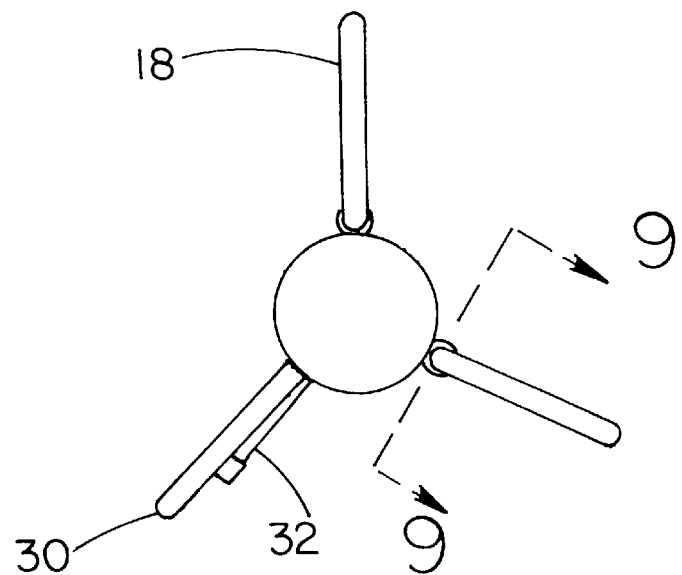
FIG. 6 is a top view of the present invention in a deployed orientation.
Figure 7:
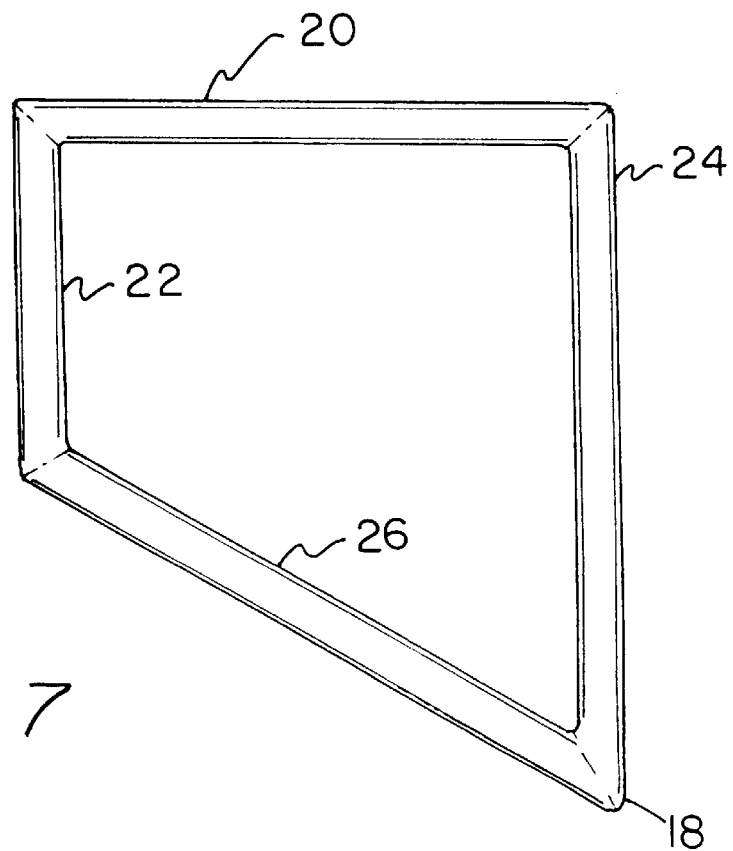
FIG. 7 is a side view of the present invention.

FIG. 4 shows that two cylindrical pipes 16 are each mounted to an exterior surface of the side wall along an axis in parallel with that of the central member. Each pipe has a length less than that of the central member and a diameter about ¼ that of the central member. The pipes are each constructed from black steel.

Next provided are three legs 18 constructed from black steel and each having a horizontally oriented linear top bar 20 and a vertically oriented first linear side bar 22 connected to one end of the top bar and extending downwardly therefrom. The first linear side bar is equipped with a first length which is about twice a height of the central member. A vertically oriented second linear side bar 24 is connected to another end of the top bar and extends downwardly therefrom. The second linear side bar is equipped with a second length greater than the first length. An angled linear bottom bar 26 is connected between bottom ends of the side bars such that each of the bars reside in a similar plane.

The first linear side bar of two of the legs has a central extent being rotatably coupled within the two pipes. This is accomplished in a manner shown in FIG. 9. Essentially, a pair of spaced washers 28 are welded to the forgoing two legs which extend radially therefrom in the form of flanges for precluding vertical movement within the pipes. This affords a superior coupling which allows the legs to support great amounts of weight. Ideally, the weld is effected on an upper and lower surface of the top and bottom washers, respectively. Note FIG. 9. The first linear side bar of another one of the legs 30 has a central extent being fixedly welded directly to the central member. As such, the present leg resides in a plane extending radially from the central member. In use, the legs have deployed orientations extending radially from the central member and spaced by 120 degrees. Further, the legs are capable of stored orientations each directed in a similar direction and residing in parallel planes.

Also included is a rigid inlet pipe 32 constructed from black steel which is linear along an entire length thereof. The inlet pipe has an inboard threaded end and an outboard threaded end. A first portion 34 of the pipe adjacent to and spaced from the inboard end is welded to a lower peripheral edge of the central member. As such, the inlet pipe extends radially therefrom. A second portion 36 of the pipe adjacent to and spaced from the first portion is welded to the first linear side bar of the fixed leg. The outboard threaded end of the inlet pipe terminates half way between the linear side bars, as shown in FIG. 4.

For precluding the inlet tube from being inadvertently removed, a linear brace 38 has a first end welded to an upper extent of the first linear side bar of the fixed leg at a point level with the top face of the central member. A second end of the brace is welded to an inboard extent of the bottom bar of the fixed leg such that the brace resides within the plane that includes the bars of the fixed leg. It should be noted that a central extent of the inlet pipe is welded just below a central extent of the brace. In the preferred embodiment, the brace is planar rectangular in form with a width equal to a cross-sectional diameter of the bars of the fixed leg.

Figure 8:
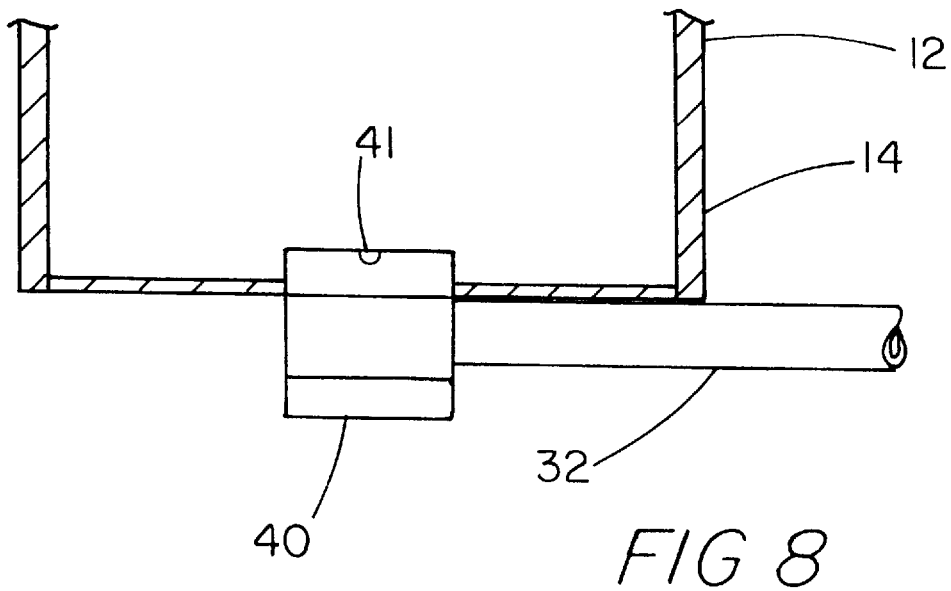
FIG. 8 is a cross-sectional view of the present invention taken along line 8—8 shown in FIG. 4.
Figure 9:
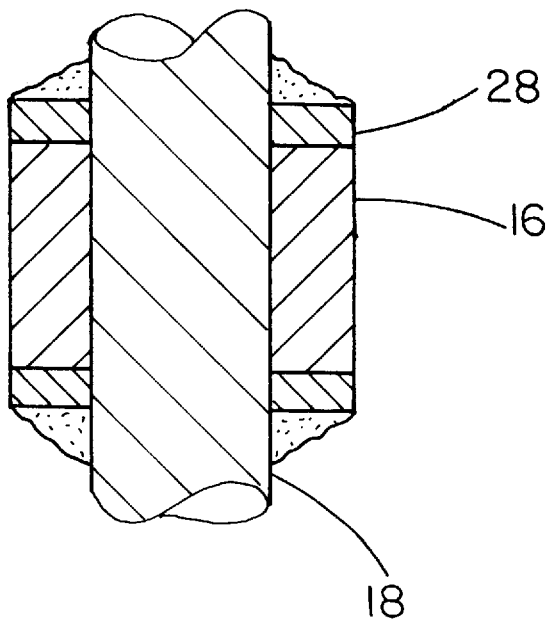
FIG. 9 is a cross-sectional view of the present invention taken along line 9—9 shown in FIG. 6.

Mounted on the end of the inlet tube is a brass cap 40 having a closed end, an open end, and a hexagonal side wall. Note FIG. 8. The side wall defines an interior space having a threaded periphery adjacent the open end for attachment to the inboard threaded end of the inlet tube. The side wall has an orifice 41 formed therein which remains in communication with the inlet tube. As shown in FIG. 8, a majority of the bottom open face of the central member remains open for optimum ventilation.

Finally, an elastomeric flexible hose 42 is provided including a first end having a threaded sleeve rotatably coupled thereto for releasably engaging the outboard threaded end of the inlet tube. A second end of the flexible hose has a quick release adapter 44 for removably attaching to a propane source.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foldable propane cooker comprising, in combination:

a vertically oriented cylindrical central member having a tubular side wall, an open bottom face, and an open top face which each define openings having a diameter equal to that of the central member;

two cylindrical pipes each mounted to an exterior surface of the side wall along an axis in parallel with that of the central member, each pipe having a length less than that of the central member and a diameter about ¼ that of the central member;

three legs each having a horizontally oriented linear top bar, a vertically oriented first linear side bar connected to one end of the top bar and extending downwardly therefrom with a first length which is about twice a height of the central member, a vertically oriented second linear side bar connected to another end of the top bar and extending downwardly therefrom with a second length greater than the first length, an angled linear bottom bar connected between bottom ends of the side bars such that each of the bars reside in a similar plane, the first linear side bar of two of the legs having a central extent being rotatably coupled within the two pipes and further having a pair of spaced washers welded thereto and extending radially therefrom for precluding vertical movement within the pipes, the first linear side bar of one of the legs having a central extent being fixedly welded directly to the central member such that the same resides in a plane extending radially from the central member, wherein the legs have deployed orientations extending radially from the central member and spaced by 120 degrees and stored orientations each directed in a similar direction and residing in parallel planes;

a rigid inlet pipe being linear along an entire length thereof and having an inboard threaded end and an outboard threaded end, a first portion of the pipe adjacent to and spaced from the inboard end being welded to a lower peripheral edge of the central member such that the inlet pipe extends radially therefrom, and a second portion of the pipe adjacent to and spaced from the first portion being welded to the first linear side bar of the fixed leg, wherein the outboard threaded end of the inlet pipe terminates half way between the linear side bars;

a linear brace having a first end welded to an upper extent of the first linear side bar of the fixed leg at a point level with the top face of the central member and a second end welded to an inboard extent of the bottom bar of the fixed leg such that the brace resides within the plane that includes the bars of the fixed leg, wherein a central extent of the inlet pipe is welded just below a central extent of the brace;

a brass cap having a closed end, an open end, and a hexagonal side wall defining an interior space having a threaded periphery adjacent the open end for attachment to the inboard threaded end of the inlet tube, wherein the side wall has an orifice formed therein which remains in communication with the inlet tube; and a flexible hose including a first end having a threaded sleeve rotatably coupled thereto for releasably engaging the outboard threaded end of the inlet tube and a second end with a quick release adapter for removably attaching to a propane source.

2. A foldable propane cooker comprising:

a vertically oriented cylindrical central member having a tubular side wall, an open bottom face, and an open top face which each define openings having a diameter equal to that of the central member;

two cylindrical pipes each mounted to an exterior surface of the side wall along an axis in parallel with that of the central member;

three legs each having a horizontally oriented linear top bar, a vertically oriented first linear side bar connected to one end of the top bar and extending downwardly therefrom with a first length which is about twice a height of the central member, a vertically oriented second linear side bar connected to another end of the top bar and extending downwardly therefrom with a second length greater than the first length, an angled linear bottom bar connected between bottom ends of the side bars such that each of the bars reside in a similar plane, the first linear side bar of two of the legs having a central extent being rotatably coupled within the two pipes and further having a pair of spaced flanges extending radially therefrom for precluding vertical movement within the pipes, the first linear side bar of one of the legs having a central extent being fixed to the central member such that the same resides in a plane extending radially from the central member, wherein the legs have deployed orientations extending radially from the central member and spaced by 120 degrees and stored orientations each directed in a similar direction and residing in parallel planes;

a rigid inlet pipe being linear along an entire length thereof and having an inboard threaded end, and a portion of the pipe adjacent to and spaced from the inboard end being connected to a lower peripheral edge of the central member such that the inlet pipe extends radially therefrom, wherein the outboard end of the inlet pipe terminates half way between the linear side bars;

a linear brace having a first end connected to the first linear side bar of the fixed leg and a second end connected to the bottom bar of the fixed leg such that the brace resides within the plane that includes the bars of the fixed leg, wherein a central extent of the inlet pipe is connected to the brace;

a brass cap having a closed end, an open end, and a side wall defining an interior space having a threaded periphery adjacent the open end for attachment to the inboard threaded end of the inlet tube, wherein the side wall has an orifice formed therein which remains in communication with the inlet tube.

3. A foldable propane cooker as set forth in claim 2 wherein a second portion of the pipe is connected to the first linear side bar of the fixed leg.

4. A foldable propane cooker as set forth in claim 2 wherein each pipe having a length less than that of the central member and a diameter about ¼ that of the central member.

5. A foldable propane cooker as set forth in claim 2 and further including a flexible hose with a first end having a threaded sleeve rotatably coupled thereto for releasably engaging the outboard end of the inlet tube and a second end with a quick release adapter for removably attaching to a propane source.

* * * * *